(12) United States Patent
Nauta et al.

(10) Patent No.: US 7,972,458 B2
(45) Date of Patent: Jul. 5, 2011

(54) FILTER MATERIAL AND PROCESS FOR PRODUCING SAME

(75) Inventors: Phillip Nauta, Stouffville (CA); Yu Lie Qin, Wenzhou (CN)

(73) Assignee: UV Corporation, Toronto (CA)

( * ) Notice: Subject to any disclaimer, the term of this patent is extended or adjusted under 35 U.S.C. 154(b) by 421 days.

(21) Appl. No.: 12/045,659

(22) Filed: Mar. 10, 2008

(65) Prior Publication Data

US 2009/0223190 A1 Sep. 10, 2009

(51) Int. Cl.
  *B27N 3/04* (2006.01)
  *D04H 1/58* (2006.01)
  *D04H 3/12* (2006.01)
(52) U.S. Cl. ..... 156/181; 156/62.2; 156/180; 156/273.7; 156/275.5; 55/DIG. 5; 264/128; 264/DIG. 48; 427/434.2
(58) Field of Classification Search .............. 55/486, 55/487, 488, 489; 427/244, 434.2–434.6; 156/62.2, 166, 176, 180, 181, 273.7, 275.5; 264/128, DIG. 48
See application file for complete search history.

(56) References Cited

U.S. PATENT DOCUMENTS

| | | | | |
|---|---|---|---|---|
| 2,698,260 A * | 12/1954 | Francois et al. | | 427/345 |
| 3,019,127 A * | 1/1962 | Czerwonka et al. | | 428/338 |
| 3,498,031 A | 3/1970 | Fesco | | |
| 4,146,417 A * | 3/1979 | Drelich et al. | | 156/62.2 |
| 4,699,681 A * | 10/1987 | Kasmark et al. | | 156/264 |
| 5,124,177 A * | 6/1992 | Kasmark et al. | | 427/202 |
| 5,266,138 A * | 11/1993 | Razavi | | 156/177 |
| 5,306,534 A | 4/1994 | Bosses | | |
| 5,338,340 A * | 8/1994 | Kasmark et al. | | 96/135 |
| 5,641,563 A * | 6/1997 | Truong et al. | | 442/327 |
| 5,656,333 A * | 8/1997 | Truong et al. | | 427/243 |
| 5,883,019 A * | 3/1999 | Troung et al. | | 442/166 |
| 5,919,717 A * | 7/1999 | Wallick | | 442/334 |
| 5,922,166 A * | 7/1999 | Dillon | | 156/324.4 |
| 5,993,501 A * | 11/1999 | Cusick et al. | | 55/486 |
| 6,013,587 A * | 1/2000 | Truong et al. | | 442/166 |
| 6,056,809 A * | 5/2000 | Chapman | | 96/67 |
| 6,156,681 A * | 12/2000 | Tamaru et al. | | 442/383 |
| 6,315,806 B1 * | 11/2001 | Torobin et al. | | 55/522 |
| 6,322,615 B1 * | 11/2001 | Chapman | | 96/67 |
| 6,689,242 B2 * | 2/2004 | Bodaghi | | 156/181 |
| 7,037,960 B2 * | 5/2006 | Ukai | | 524/13 |
| 2004/0242108 A1 * | 12/2004 | Russell et al. | | 442/414 |
| 2005/0020161 A1 * | 1/2005 | Dummer | | 442/104 |
| 2010/0129614 A1 * | 5/2010 | Whitehead et al. | | 428/184 |

* cited by examiner

*Primary Examiner* — Robert A Clemente
(74) *Attorney, Agent, or Firm* — Renner, Otto, Boisselle & Sklar, LLP

(57) ABSTRACT

A filter material and process for producing a filter material, which may be used as a vacuum cleaner bag or a household air filter, are provided. Embodiments of the filter material comprise a porous substrate comprising a plurality of recycled fibers bound together by an adhesive. Embodiments of the process comprise arranging a plurality of fibers to form a layer; providing an amount of an adhesive to the fibers such that when the adhesive has cured, the layer is porous; and curing the adhesive.

11 Claims, 2 Drawing Sheets

FILTER MATERIAL AND PROCESS FOR PRODUCING SAME

FIELD OF THE INVENTION

The invention relates to a filter material, and to a process for producing a filter material. In one aspect, the invention relates to a filter material comprising recycled fibers, and process for producing the filter material from the fibers. The filter material may be used in the construction of vacuum cleaner bags and air filters.

BACKGROUND OF THE INVENTION

Filters are often used in airflow paths in order to remove particulate matter from air. Such airflow paths may include those in vacuum cleaners or furnaces, for example. Filters may be made from a variety of filter materials, which may be used alone or in combination.

Previously, vacuum cleaners used filter bags that were typically constructed from paper. A disadvantage of filter bags is that they could rip or puncture, thereby releasing too much dirt into a room that is being cleaned. Bags could also be difficult to replace and could result in the release of dirt from the bag when a used bag was removed from the vacuum cleaner.

Commencing in about the 1980's, vacuum cleaners were commercialized which used cyclones as the primary filtration means. Currently, many commercial vacuum cleaners use at least one cyclone for dirt filtration. An advantage of the use of cyclones is that the user does not have to change a bag. Instead, the user has to typically remove the cyclonic cleaning stage from the vacuum cleaner, open the cyclonic cleaning stage if needed, and empty the dirt container or containers therein. A disadvantage with such a design is that the dirt collected in the dirt container must be poured or dumped out, resulting in the release of fine dirt into the air.

SUMMARY OF THE INVENTION

In accordance with the instant invention a filter material is made from fibres, wherein at least a portion of which are preferably recycled, and an adhesive. This filter material may be used to construct vacuum cleaner bags and other filtration material, such as an air filter for a room air cleaner, a furnace filter and the like.

In a particularly preferred embodiment, the fibres for the filter material are all, or essentially all, recycled fibres. For example, the fibres may be obtained from waste cloth that is produced in the garment industry. The waste cloth may be shredded or otherwise broken down to produce bulk fibres that may be used as a starting material for this process. Accordingly, the process provides a use for a material that may otherwise be discarded.

A further advantage is that the filter material, e.g., the vacuum cleaner bag or furnace filter may be disposable. While the vacuum cleaner bag or furnace filter may end up in a land fill site, the bulk of the material from which it was made preferably commenced as a waste material and may have ended up in a land fill site as it was waste material. Accordingly, the disposal of the filter material made from waste fibres need not result in a large addition to land fill.

Furthermore, the adhesive may be made from a naturally occurring compound, such as corn starch. Therefore, even if the vacuum cleaner bag is disposable, an environmentally friendly adhesive has been used.

In a first broad aspect, a process for producing a filter material is provided. The process comprises providing a plurality of fibers to form a layer; providing an amount of an adhesive to the layer and obtaining an adhesive treated layer such that, when the adhesive treated layer has been cured, the adhesive treated layer is porous; and curing the adhesive, wherein the filter material is obtained.

In some embodiments, the fibers are arranged to form the layer by depositing the plurality of fibers on a screen. In further embodiments, the plurality of fibers are air deposited on the screen.

In some embodiments, the adhesive is provided to the fibers by securing the fibers to a screen and passing the screen through a bath of adhesive. In some further embodiments, a second screen is applied above the fibers prior to passing the screens through the bath of adhesive. Accordingly, the fibres are secured in position while, e.g., being conveyed through a bath of adhesive.

In some embodiments, an excess of adhesive is provided to the fibers, and subsequently a portion of the adhesive is removed from the fibers. For example, a portion of the adhesive is removed from the layer by passing the layer between at least two rollers. Such embodiments may be advantageous since it permits the fibres to be evenly coated, such as by immersing them in an adhesive, and then removing excess adhesive resulting in fibres that are evenly coated but will result in a substrate that is porous when the adhesive has been cured. Accordingly, the substrate may be used as a filter material.

In some embodiments, the adhesive is cured by heating the layer.

In some embodiments, the process further comprises shredding pieces of fabric to form the fibers.

In some embodiments, the process may produce a filter material, which may be used to form a vacuum bag, or a furnace filter or a room air filter.

In a second broad aspect, a process for producing a filter material is provided. The process comprises providing a plurality of fibers to form a layer; combining the layer with an adhesive and obtaining a treated adhesive layer; applying pressure to the treated adhesive layer to remove a portion of the adhesive; and, curing the adhesive. Any of the other embodiment described for use with the first broad aspect may be used with this aspect.

In a third broad aspect, a filter material for an airflow path is provided. The filter material comprises a porous substrate comprising a plurality of recycled fibers bound together by an adhesive.

In some embodiments, the fibres are recycled cloth fibres. In some further embodiments, the fibers comprise at least one of cotton, nylon, polypropylene, polyethylene terephthalate, polyester, acrylic and viscose.

In some embodiments, the porous substrate comprises pores of between 0.01 and 80 microns in diameter, preferably between 0.1 and 20 microns in diameter and more preferably between 0.1 and 5 microns in diameter.

In some embodiments, the porous substrate comprises from about 5 g to 40 g of glue, preferably from about 20 g to 30 g of glue per 80 g of fibers.

In some embodiments, the fibers are between 0.5 cm and 4 cm, and preferably between 1.5 cm and 3 cm in length.

In some embodiments, the adhesive is a corn-starch based adhesive. In some other embodiments, the adhesive is polyvinyl acetate.

In some embodiments, the filter material comprises one or more additional porous substrates positioned upstream and/or downstream from the porous substrate.

BRIEF DESCRIPTION OF THE DRAWINGS

These and other advantages of the present invention will be more fully and particularly understood in connection with the following description of the preferred embodiments of the invention in which.

DETAILED DESCRIPTION OF THE INVENTION

Figure 1:
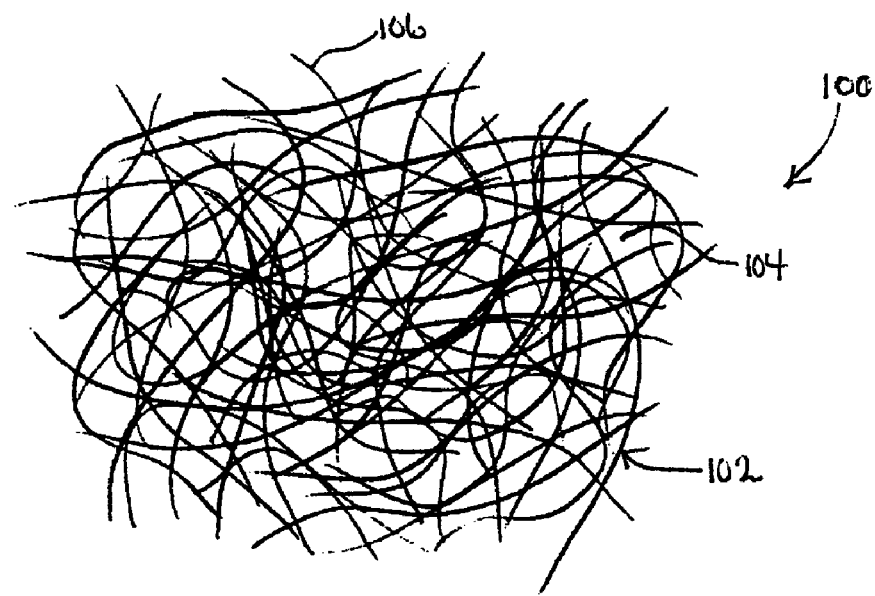
FIG. 1 is an enlarged view of an embodiment of a fiber material of the present invention.

An embodiment of a filter material 100 of the present invention is shown in FIG. 1. The filter material may be used in a variety of filters, such as furnace filters, vacuum cleaner bags, filters for room air cleaners, car air cleaners or other filters used in an airflow path.

The filter material comprises a porous substrate 102. That is, the filter material comprises a layer through which pores 104 extend, such that air may pass through the pores, while certain sizes of particulate matter is prevented from passing through the pores. The pores may be of a variety of sizes, depending on the intended use of the filter material. In some embodiments, the pores are between 0.01 and 80 microns in diameter, preferably between 0.1 and 20 microns in diameter and more preferably between 0.1 and 5 microns in diameter.

Further, due to the structural strength that may be obtained, the material may be used as a substrate to support additional layers. For example, one or more filter layers may be applied on the upstream and/or downstream side of the material. The one or more additional layers may be a plastic such as polypropylene (e.g., melt blown PP) and polylactic acid (PLA). Accordingly, a layered filter material capable of filtering 0.3 um particles may be obtained. Accordingly, a HEPA level of filtration may be obtained (99.97% at 0.3 microns).

The porous substrate comprises a plurality of fibres, wherein some, and preferably all, may be recycled fibers 106 bound together by an adhesive. As used herein, the term 'recycled fibers' indicates that the fibers are obtained from a material that was initially manufactured for a use other than producing a filter material, or from a material that may otherwise have been discarded as waste. For example, scraps of leftover fabric may be obtained from the textile or clothing industries, and may be shredded (i.e., disaggregated) to obtain the fibers. The cloth may be excess cloth that is cut off when clothing is made, a second or the like. The fibers are preferably cotton fibers, but may comprise a variety of other materials, such as nylon, polypropylene, polyethylene terephthalate, polyester, acrylic, viscose, or combinations thereof. The fibers may be of a variety of sizes. In some embodiments, the fibers may be between 0.5 cm and 4 cm in length. In the preferred embodiment, the fibers may be between 1.5 cm and 3 cm in length.

As previously mentioned, the fibers are bound together by an adhesive. That is, although some of the fibers may be knotted together, the majority of the fibers are preferably randomly oriented and are held together by an adhesive. The adhesive may be, for example, corn-starch based, polyvinyl acetate based, polylactic acid or the like. The adhesive is preferably a liquid. For example, the adhesive comprise 5 kg to 40 kg, preferably about 20 kg of cornstarch per 30 gallons of water.

Prior to treating the fibers to produce the filter material, a variety of optional steps may be performed. In some embodiments, the fibers may be combed in order to orient the fibers and remove any tangles or knots in the fibers. For example, the fibers may be air-blown onto a rotating drum, one or more combs may be passed through the fibers or the like. The fibres may be cleaned. Further, the fibres may be sorted by color or may be mixed to provide material 100 that has a more uniform appearance.

According to a process of this invention, a layer is produced from a plurality of the fibres. Preferably the fibres are air laid. For example, as diagrammatically exemplified in FIG. 2, the fibers 302 are continuously air blown onto a conveying surface 304 to form a continuous layer 306. The fibers may be blown onto conveying surface 304 from a storage tank, from another conveyor, or from a combing process. For example, the fibres may be stored in a hopper 322 and allowed to fall due to gravity onto conveying surface 304. Additionally, air flow, from e.g. blower 324, may be used to assist the deposition of fibres 302 from hopper 322 to conveying surface 304.

Preferably, conveying surface 304 is porous. For example, in the embodiment shown, conveying surface 304 comprises a screen, which is sized such that the fibers are retained on the screen, but liquids may pass through the screen. Accordingly fibres 302 may be deposited by passing conveying surface 304 through an air flow passage such that conveying surface 304 passes transversely through the passage. The air will pass through the screen and fibres 302 will be retained on conveying surface 304. An advantage of such a design is that air transport may be used to provide an even distribution of fibres across the width of conveying surface 304. Further, the air transport may result in fibres commencing to inter-engage.

It will be appreciated that a liquid, such as water, may be used to transport the fibers and deposit them on conveying surface 304. In such a case, fibres 302 may have to be dried prior to combining fibres 302 with the adhesive.

Although in the embodiments shown, a single conveying surface is used throughout the process, it will be appreciated that more than one conveying surface may be used.

It will be appreciated that one or more rollers or other members may be used to compress of align the fibres in layer 306 prior to applying the adhesive.

The amount of fiber arranged to form the layer may vary, depending on the desired properties of the final product. In some embodiments, layer 306 comprises from 5 to 200 grams of fibers per square meter.

An amount of adhesive 312 is subsequently provided to the fibers 302. The amount of adhesive provided is selected such that when the adhesive is cured, the layer is porous. That is, the adhesive is provided such that when it is cured, it does not occlude all of the pores that extend through the layer 306 between the fibers 302. The amount of adhesive which, when cured, will provide a porous substrate 102 having a desired degree of filtration will vary depending on several factors including the degree of filtration that is required and the degree to which the adhesive will shrink during curing. In some embodiments, filter material 100 may comprise between about 5 g and 40 g, and preferably between about 20 g and about 30 g of cured adhesive per 80 g of fibers.

The adhesive may be provided in a number of ways. In some embodiments, a minimal amount of adhesive is applied to the fibers, such that the adhesive does not fill the pores between the fibers in continuous layer 306. For example, adhesive 312 may be sprayed onto layer 306. In the preferred embodiment, an excess of adhesive 312 is applied to the fibers, such that the pores between the fibers 302 in continuous layer 306 are occluded by adhesive 312, and subsequently a portion of adhesive 312 is removed from the fibers, such that the pores are re-opened, at least upon curing of adhesive 312. An advantage of this embodiment is that the fibres may be completely coated so that filter material 100 has sufficient structural strength that is need not be mounted on a substrate but may be self supporting or have at least sufficient structural strength such that it will not easily tear or rip while being converted, e.g., to a vacuum cleaner bag or used as such.

For example, referring again to FIG. 2, a second conveying surface 308, such as a second screen, may be applied above continuous layer 306, such that the fibers are sandwiched between screens 304 and 308. The screens and fibers may then be passed through a bath 310 of adhesive 312, such that continuous layer 306 is soaked with adhesive 312, and the fibers are completely wetted, and at least some of the pores between the fibers are occluded by adhesive 312. Alternately, it will be appreciated that adhesive 312 may be poured on top of screen 308 and permitted to flow therethrough so as to coat fibres 312.

If an excess of adhesive is applied, then the excess is then removed. The excess may be removed by permitting the excess to drip off continuous layer 306. Preferably, pressure is applied in order to squeeze excess adhesive from the fibers wherein some of the occluded pores may be reopened.

Figure 2:
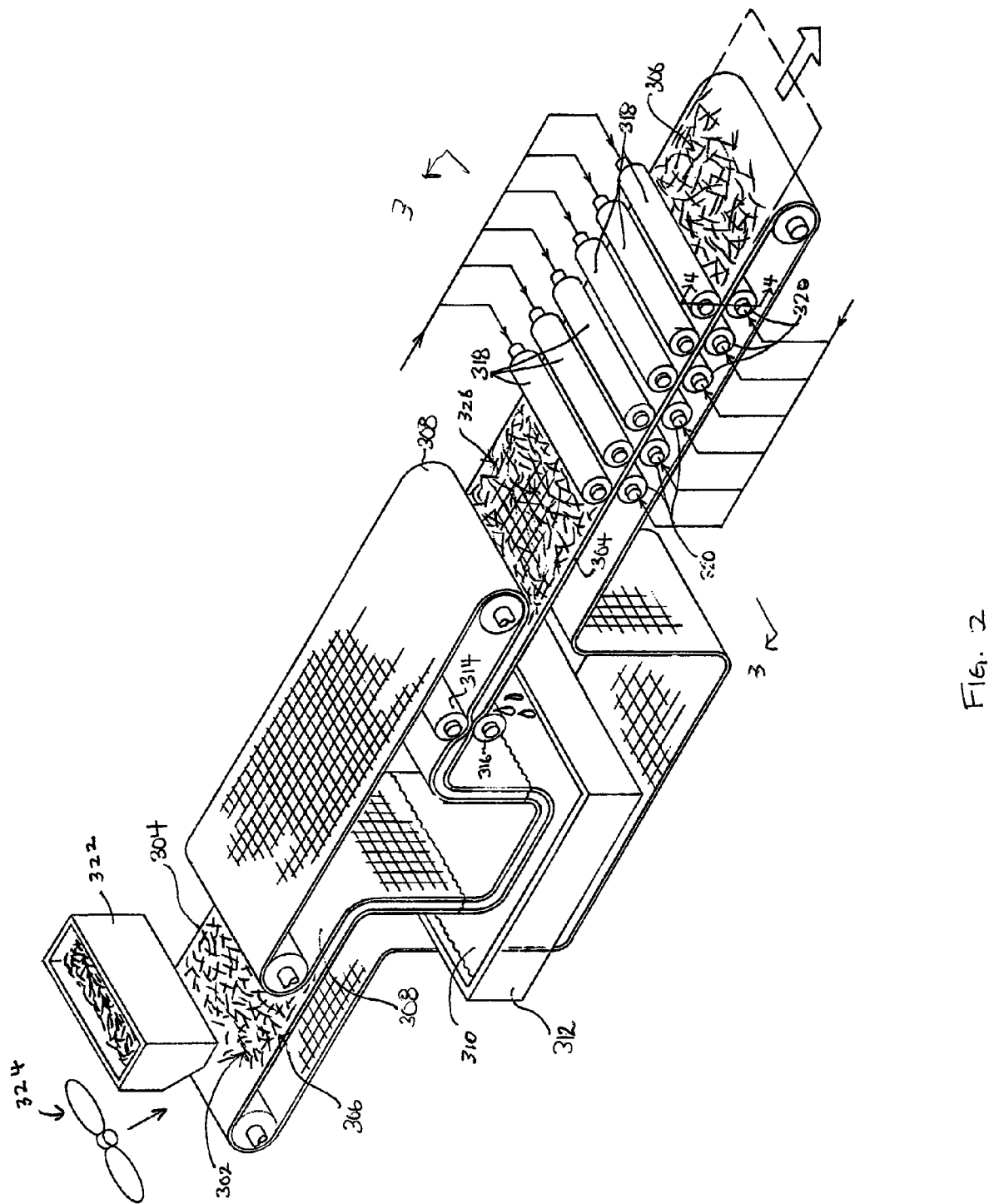
FIG. 2 is a perspective illustration of an embodiment of a process of the present invention.

As exemplified in FIG. 2, screens 304, 308 may be passed through rollers 314, 316 after exiting bath 310. Excess adhesive 312 may fall into bath 310 for reuse.

Adhesive 312 is then cured. Preferably, the curing is commenced after at least some, and preferably all excess adhesive is removed. The adhesive may be cured in a variety of ways. For example, the adhesive may be cured by the application of heat, UV light or without the application of any externally applied energy. In some embodiments, the adhesive may be cured by being left to stand for a period of time. In other embodiments, the adhesive may be cured by providing a convective heat source, e.g., a stream of hot air, to layer 306, for example using one or more fans. In the preferred embodiment, the adhesive is cured by heating.

Figure 3:
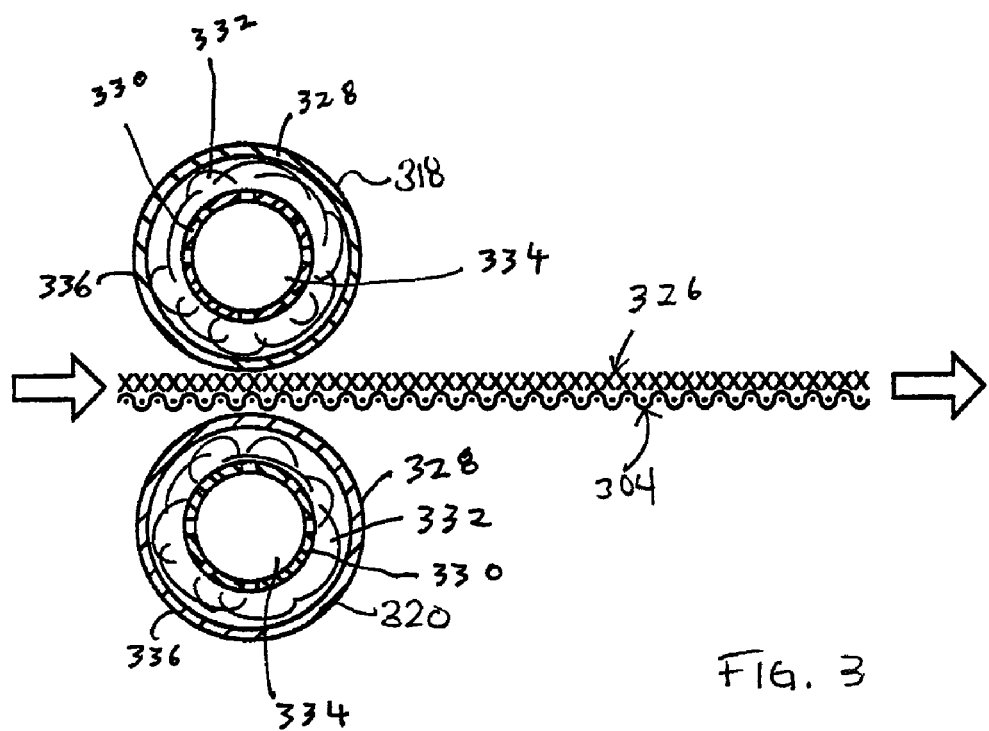
FIG. 3 is a cross-section taken along line 3-3 in FIG. 2.

As exemplified in FIGS. 2 and 3, For example, screen 308 may be removed from adhesive treated layer 326, and adhesive treated layer 326 together with screen 304 may be passed between a series of rollers 318, 320, which are heated by, e.g., the internal circulation of steam, electrical resistance heating or the like. For example, as shown in FIG. 3, roller 318, 320 has an outer wall 328 and a spaced apart inner wall 330 defining an inner chamber 332 through which a heated fluid, e.g., steam may be passed. Inner chamber 332 may be connected in fluid flow communication with a source of heated fluid by any means known in the process arts. Roller 318, 320 may be rotatably mounted by any means known in the process arts, such as by the use of a central opening 334. The outer surface 336 of rollers 318, 320 may be heated to between about 120° C. to about 130° C. In some particular embodiments rollers 318 and 320 are coated with a non-stick material, such as Teflon®, such that adhesive treated layer 326 does not adhere to the rollers as it passes therethrough. In alternate embodiments, heat may be applied in another manner. For example, adhesive treated layer 326 may be passed under an infrared heat lamp.

When the adhesive has been cured, adhesive treated layer 326 forms a porous substrate which may be used as a filter material, such as filter material 100 described hereinabove. The filter material may be used for a variety or purposes. In some embodiments, the filter material may be formed into a vacuum bag filter, for example by sewing, gluing or welding the filter material into the appropriate shape. In other embodiments the filter material may be used to form a furnace filter, such as by mounting it in a frame.

In any of these embodiments, the filter material may be used alone, or together with other types of filter material. For example, when the filter material is used to form a vacuum bag, a layer of polypropylene mesh or polylactic acid (5 gsm-200 gsm) may be provided adjacent the filter material.

It will be appreciated that certain features of the invention, which are, for clarity, described in the context of separate embodiments or separate aspects, may also be provided in combination in a single embodiment. Conversely, various features of the invention, which are, for brevity, described in the context of a single embodiment or aspect, may also be provided separately or in any suitable sub-combination.

Although the invention has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present invention.

The invention claimed is:

1. A process for producing an air filter material comprising:
    (a) providing a plurality of fibers to form a layer;
    (b) securing the fibers to a screen and passing the screen through a bath of adhesive to obtain an adhesive treated layer such that, when the adhesive has been cured, the adhesive treated layer is porous; and,
    (c) curing the adhesive.

2. The process of claim 1, wherein step (a) comprises depositing the plurality of fibers on a screen.

3. The process of claim 2, wherein the plurality of fibers are air deposited.

4. The process of claim 1, further comprising applying a second screen above the fibers prior to passing the screens through the bath of adhesive.

5. The process of claim 1, wherein step (b) comprises providing an excess of adhesive to the fibers, and subsequently removing a portion of the adhesive from the fibers.

6. The process of claim 5, wherein the portion of the adhesive is removed from the layer by passing the layer between at least two rollers.

7. The process of claim 1, wherein step (c) comprises heating the layer.

8. The process of claim 1, further comprising obtaining the fibers from waste from cloth processing.

9. The process of claim 1, further comprising shredding pieces of fabric to form the fibers.

10. The process of claim 1, further comprising providing a further filter layer on one side of the filter material.

11. A process for producing an air filter material comprising:
    (a) depositing a plurality of fibers on a screen to form a layer;
    (b) applying a second screen above the fibers to secure the fibers to the screen;
    (c) passing the screen through a bath of adhesive to obtain an adhesive treated layer such that, when the adhesive has been cured, the adhesive treated layer is porous; and
    (d) curing the adhesive.

* * * * *